(No Model.) 2 Sheets—Sheet 2.
G. B. SALADEE.
CARRIAGE SPRING.
No. 249,680. Patented Nov. 15, 1881.
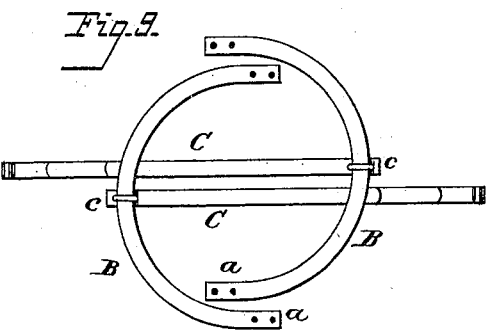
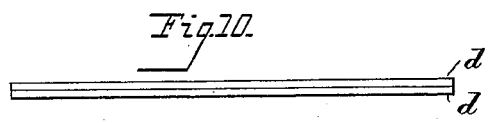
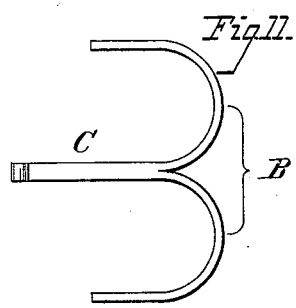
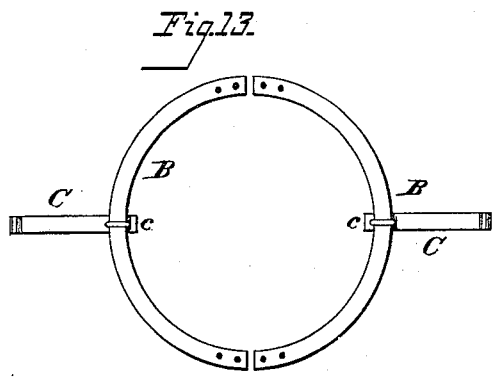
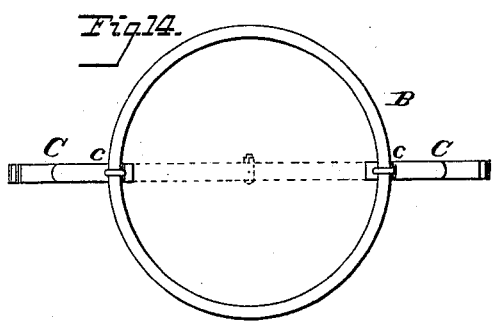
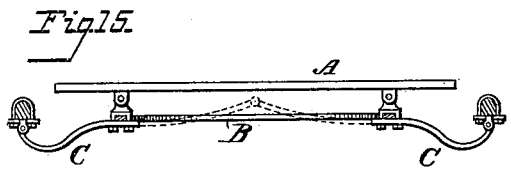
Attest:
Courtney A. Cooper
O. E. Hansmann.
Inventor:
G. B. Saladee
By his attorney
Charles E. Foster

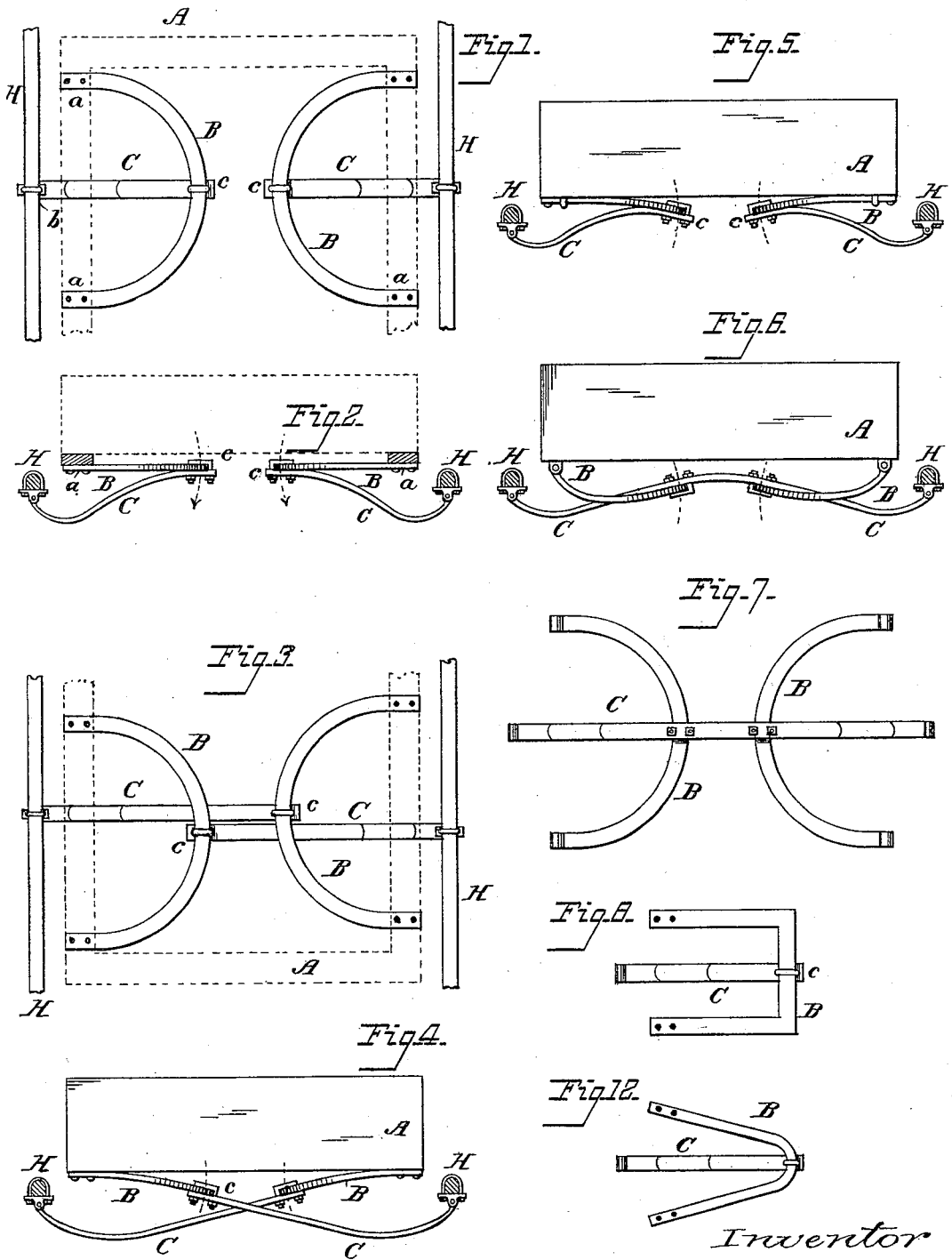

UNITED STATES PATENT OFFICE.

GAYLORD B. SALADEE, OF FREEPORT, ILLINOIS, ASSIGNOR TO CYRUS W. SALADEE, OF WOLCOTTVILLE, CONNECTICUT.

CARRIAGE-SPRING.

SPECIFICATION forming part of Letters Patent No. 249,680, dated November 15, 1881.

Application filed July 9, 1881. (No model.)

*To all whom it may concern:*

Be it known that I, GAYLORD B. SALADEE, of Freeport, in the county of Stephenson and State of Illinois, have invented certain Improvements in Springs for Side-Bar Vehicles, of which the following is a specification.

My invention relates, principally, to that class of vehicles known as "side-bar road-wagons," but the same may be employed in other classes of wagons and for other purposes; and it consists in the combination, in a spring-platform, of springs of a substantial U shape, and arms, flexible or rigid, connected to the transverse portions of the springs, and projecting beyond the fixed ends of the same.

In the drawings, Figure 1 represents, in plan, one mode of constructing my improved spring-platform. Fig. 2 is a side or front elevation of the same. Figs. 3 to 15, inclusive, are modifications of my invention.

A steel plate or rod, B, is bent into a semicircular or corresponding form, as seen in Figs. 1, 8, 12, and to the central or transverse portion of this spring is rigidly secured an arm, C, which latter may be either a rigid or a flexion arm, having its outer end connected by a shackle or otherwise to the side bar, H, or other part of the frame, as in any of the modes shown. The outer ends, *a*, of the springs B (if not made in a continuous circle, as in Figs. 14 and 15) are rigidly attached to the frame or to the body, as seen in Figs. 1, 2, 3, 4, 5, and 9, and the ends of the arms C extend beyond the ends of the springs.

In Figs. 1 and 2 the arm C and the ends *a* of the spring B are attached to the same side of the body and gear; but, when greater motion is required, the arms C may extend in opposite directions, as seen in Figs. 3 and 4, thus making the arms to cross each other.

Another mode of employing the springs B is seen in Figs. 6 and 7. Here the arms C C are in one piece, extended from one side bar to the other across the gear, and to this arm is rigidly secured the center of each spring B, their ends extended upward and jointed to the bottom of the body.

Another mode of employing the springs B and arms C is shown in Fig. 9, where both the spring and the arms overlap or pass each other in opposite directions.

A cheap and simple mode of combining the spring B and arm C is shown in Figs. 10 and 11, in which two rods of steel, *d d*, Fig. 10, of proper length and proportion, are welded together for about one-third of their length, the welded ends forming the arm C, Fig. 11, and the unwelded parts being bent to form the spring B, the outer ends of the spring B and arm C being secured to the body and side bar, as hereinbefore described in reference to other figures. I do not here claim this construction, which may form the subject-matter of a separate application for Letters Patent. The weight of the body and its load is brought to bear upon the ends *a a*, Fig. 2, and thence transferred to the junction of the arms and springs, causing the latter, by the flexion action, to spring downward from the bottom of the body in the direction of the dotted lines. As the spring descends at the junction *c* by its flexion action, there is also, when the cross portions are twisted, a torsional strain upon the spring in said cross-portion. It will also be seen from the peculiar action of the spring and arm at their junction that but a slight movement at the latter point will be greatly magnified at the outer free end of the arm C, and thus give a soft, easy, and extended motion to the body by a simple, light, and cheaply-constructed combination of parts. This effect is due to the fact that the end of the arm C extends beyond the fixed ends of the spring B, for if the ends of the arms C were in line with those of the springs the arms and springs would merely fold together without any leverage, while the motion would be limited by the distance between the ends of the arm and spring. It will be seen, on reference to Fig. 2, that by extending the arm C beyond the ends of the spring the body may drop to a point lower than that of the outer end of the arm.

In the modification shown in Figs. 3 and 4, wherein the arms are set in the opposite direction to those seen in Figs. 1 and 2, it will be seen that the action of the spring B is reversed—that is, in Fig. 2 the spring B rests, when no load is imposed, in a straight line unbent, and when loaded it is curved downward, as seen in Fig. 5; but in the construction shown in Figs. 3 and 4 the spring B is bent into the downward curve in its manufacture, and remains in that position when unloaded, but as the weight is applied the spring is by the same means as before described both twisted and forced upward into a straight line.

In the construction shown in Figs. 6 and 7, if the arm C is a flexion-spring, there results the combined spring action of all the parts; but if the arm C is a rigid support, there is only the combined flexion and torsional action of the springs B. In either case the body A will move toward the supporting-arm C, and for this reason must be hung a suitable distance above it.

Referring to Fig. 9, it will be seen that the action of the springs in this arrangement will be the same as in Figs. 1, 2, and 5—that is, they will spring downward from the body, notwithstanding the arms are crossed, as in Figs. 3 and 4.

Referring to Fig. 8, it will be understood that the invention is not limited to the use of the semicircular or circular form of spring B seen in the other figures. While I find the latter the best adapted to the purpose, I have used successfully a U-shaped spring, as in Fig. 8, and also a V-shaped spring, B, as seen in Fig. 12. The spring and arms may be arranged as in Fig. 13, and the spring B in the latter case may be united, forming an unbroken ring. In either case the springs are attached to the center of the body, and the union of the two substantially U-shaped springs does not affect the action.

If preferred, as in Figs. 14 and 15, the inner ends of the arms C may be hinged to the bottom of the body, and their outer ends to the side bars, with a continuous unbroken circular spring, B, rigidly attached to the arms C at or near their pivots.

It will be apparent that the ends of the springs may be connected to the side bars or frame, and the ends of the arms to the body.

I claim—

1. In a spring-platform, arms combined with springs of a substantial U shape, which springs are connected at their transverse portions to the arms, the opposite ends of which extend beyond the springs for connection to the body or frame, substantially as set forth.

2. The combination, in a vehicle, of the body, frame, arms C, and U-shaped springs B, the arms being connected to the centers of the springs and extending beyond the springs, and both arms and springs being attached at the ends to the body and frame, substantially as described.

3. The combination, in a vehicle, of the arms C, connected to the frame, and the U-shaped springs connected at the centers to the arms, the latter extending beyond the springs, substantially as set forth.

In testimony whereof I have signed my name to this specification in the presence of two subscribing witnesses.

GAYLORD B. SALADEE.

Witnesses:
MICHAEL STOSKOPF,
DANIEL M. WADE.